Patented Jan. 31, 1939

2,145,808

UNITED STATES PATENT OFFICE 2,145,808

VULCANIZATION OF RUBBER AND PRODUCTS OBTAINED THEREBY

Robert L. Sibley, Nitro, W. Va., assignor, by mesne assignments, to Monsanto Chemical Company, St. Louis, Mo., a corporation of Delaware No Drawing. Application March 22, 1935, Serial No. 12,474

25 Claims. (Cl. 18—53)

The present invention relates to new vulcanization accelerators, to a process of vulcanizing rubber and to the vulcanization products obtained with the aid of the said new vulcanization accelerators.

The new and preferred class of rubber vulcanization accelerators comprise the reaction products obtainable by reacting a methylol carbamide with a mercapto-thiazole.

As typical examples of a methylol carbamide employed in the preparation of the preferred new class of accelerators are dimethylol carbamide and methylol thiocarbamide. As typical examples of mercapto-thiazoles which are reactive with a methylol carbamide and form therewith the new class of vulcanization accelerators are 2-mercapto-4-methylthiazole, 2-mercapto-benzothiazole, 2-mercapto-naphtha-thiazole, 2-mercapto-6-nitrobenzothiazole, 2-mercapto-5-chlorbenzothiazole, 2-mercapto-4-methylbenzothiazole and the analogues and equivalents thereof.

The compounds of the present invention may be prepared by reacting varying amounts of a methylol carbamide and a mercapto-thiazole. Preferably from one to two molecular proportions of mercapto-thiazole are reacted with one molecular proportion of methylol carbamide.

In the preparation of the compounds of the present invention it is believed the reaction takes place either as a direct addition of the reacting components as in a salt formation or as a condensation of the reacting components. Provided the reaction is a condensation with the elimination of water, it is believed the preferred accelerators may be assigned the following general formula:

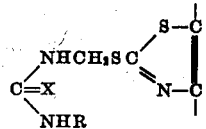

where X is a sulfur or oxygen atom and R is hydrogen, an alkyl, aryl, aralkyl or CH₂OH radical or the grouping

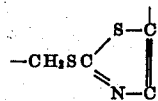

The following specific example is to be understood as an illustrative embodiment of the invention and not in any sense limitative of the scope thereof.

Example

Dimethylol carbamide was prepared in substantially a theoretical yield by reacting substantially one molecular proportion of urea and substantially two molecular proportions of formaldehyde according to the method of Dixon, Journal of The Chemical Society 113, 247 (1918), wherein the urea and formaldehyde are mixed in a suitable reactor, just neutralized with dilute alkali hydroxide, and allowed to stand for a day or two at room temperature. The soft mushy solid so obtained together with a convenient quantity of a suitable organic solvent, for example ethyl alcohol, and substantially two molecular proportions of mercapto-benzo-thiazole were placed in a suitable reactor equipped with an agitator and reflux condenser. After refluxing for a convenient period of time, for example 24 to 48 hours, the product so obtained was filtered off, washed with ethyl alcohol and dried. The crude product so obtained melts at substantially 221 to 223° C. (corrected). Further purification of said crude product may be effected by recrystallization from a convenient and suitable solvent, for example pyridine, whereupon a pale yellow solid melting at 231° to 232° C. (corrected) is obtained. The product is also readily soluble in ortho dichlorbenzene.

It is believed the reactions involved in the preparation of the above identified material proceed as follows, although the present invention is not limited to any theory as to the formulation of the reactions involved in the preparation of the new and preferred class of accelerators.

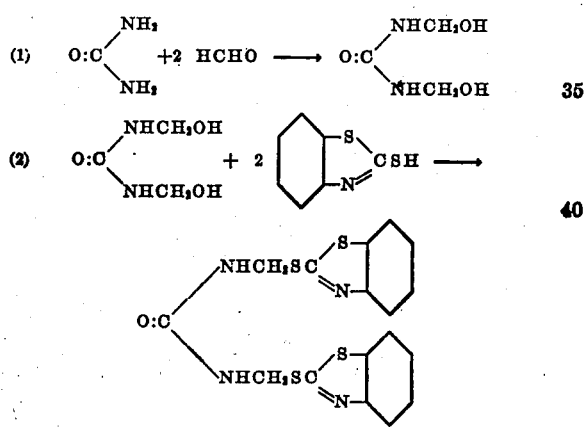

The product obtained as described was incorporated in the usual manner into a rubber stock comprising

| | Parts |
|---|---|
| Pale crepe rubber | 100 |
| Zinc oxide | 5 |
| Sulfur | 3 |
| Stearic acid | 1 |
| Reaction product of dimethylol carbamide and mercapto-benzothiazole | 1 |

The rubber stock so obtained was vulcanized by heating for different periods of time at the temperature of 30 pounds of steam pressure per square inch. The tests on the vulcanized rubber product follow in Table I.

Table I

| Cure time in minutes | Modulus of elasticity in lbs/in.² at elongations of— | | Tensile at break in lbs/in.² | Ultimate elongation percent |
|---|---|---|---|---|
| | 500% | 700% | | |
| 30 | 249 | 895 | 1898 | 835 |
| 45 | 381 | 1345 | 2560 | 810 |
| 60 | 439 | 1678 | 2680 | 785 |

The data set forth above show that the new and preferred class of accelerators, for example, the reaction product of dimethylol carbamide and mercapto-benzo-thiazole possess desirable accelerating properties. Moreover, the above uncured stock showed no "set up" or prevulcanization as determined by the Williams Plastometer described by Williams, Industrial and Engineering Chemistry for 1924 (vol. 16, page 362—see also Krall, ibid, vol. 16, page 922) on heating for 180 minutes at 200° F.

While the preferred class of materials may be employed alone as accelerators, their accelerating action is markedly increased by employing therewith organic nitrogen containing accelerators, as activators thereof, such for example, as diphenyl guanidine, diortho tolyl guanidine, hexa methylene tetramine, Shiff's bases, aldehyde ammonia, cyclohexylamine, guanidine salts, for example, diphenyl guanidine phthalate and analogues thereof. As a specific example of the use of organic nitrogen containing accelerators in conjunction with the new accelerators of the present invention a rubber stock was compounded comprising—

| | Parts |
|---|---|
| Pale crepe rubber | 100 |
| Zinc oxide | 8 |
| Stearic acid | 0.5 |
| Sulfur | 2.5 |
| Reaction product of dimethylol carbamide and mercapto-benzo-thiazole | 0.45 |
| Diphenyl guanidine | 0.30 |

The rubber stock so compounded was vulcanized by heating for different periods of time in a press at the temperature of 20 pounds of steam pressure per square inch. The tensile and modulus figures obtained on the cured product follow in Table II.

Table II

| Cure time, minutes | Modulus of elasticity in lbs/in.² at elongations of— | | Tensile at break in lbs/in.² | Ultimate elongation, percent |
|---|---|---|---|---|
| | 500% | 700% | | |
| 30 | 695 | 2645 | 3665 | 765 |
| 45 | 886 | 3395 | 3860 | 730 |
| 60 | 960 | 3580 | 3660 | 705 |

As further specific examples of the use of the preferred class of new materials in conjunction with organic nitrogen containing accelerators, the following stocks were compounded:

| | Stock A parts | Stock B parts |
|---|---|---|
| Pale crepe rubber | 100 | 100 |
| Zinc oxide | 8 | 8 |
| Sulfur | 2.5 | 2.5 |
| Stearic acid | 0.5 | 0.5 |
| Diphenyl guanidine phthalate | 0.25 | |
| Cyclohexylamine | | 0.15 |
| Reaction product of dimethylol carbamide and mercapto-benzo-thiazole | 0.50 | 0.60 |

The rubber stocks were vulcanized by heating for different periods of time in a press at the temperature of 20 pounds of steam pressure per square inch. The test results on the cured rubber product follow in Table III.

Table III

| Stock | Time of cure, minutes | Modulus of elasticity in lbs./in.² at elongations of— | | Tensile at break in lbs./in.² | Ultimate elongation, percent |
|---|---|---|---|---|---|
| | | 500% | 700% | | |
| A | 30 | 398 | 1515 | 2315 | 780 |
| B | 30 | 728 | 2865 | 4050 | 780 |
| A | 45 | 643 | 2380 | 2730 | 720 |
| B | 45 | 853 | 3295 | 4570 | 775 |
| A | 60 | 751 | 2890 | 3335 | 725 |
| B | 60 | 920 | 3555 | 4460 | 750 |

From the data set forth in Table III, it is readily apparent that diphenyl guanidine phthalate and cyclohexylamine possess desirable activating action when employed in conjunction with a reaction product of a mercaptothiazole and a methylol carbamide.

The new and preferred class of accelerators also exhibit desirable accelerating properties when employed in tread stocks and stocks employing "reclaimed" rubber. As specific examples of the use thereof in tread stocks rubber mixes were compounded comprising:

| | Stock C parts | Stock D parts |
|---|---|---|
| Smoked sheet rubber | 100 | 100 |
| Carbon black | 50 | 50 |
| Zinc oxide | 5 | 5 |
| Sulfur | 3 | 3 |
| Stearic acid | 3 | 3 |
| Pine tar | 2 | 2 |
| Reaction product of dimethylol carbamide and mercapto-benzothiazole | 1 | 0.8 |
| Cyclohexylamine | | 0.2 |

The compounded stocks were vulcanized by heating in a press under a steam pressure of 30 pounds per square inch. The test data on the cured rubber products follow in Table IV.

Table IV

| Stock | Time of cure, minutes | Modulus of elasticity in lbs./in.² at elongations of— | | | Tensile at break in lbs./in.² | Ultimate elongation, percent |
|---|---|---|---|---|---|---|
| | | 200% | 300% | 400% | | |
| C | 60 | 980 | | 2625 | 3630 | 530 |
| D | 60 | | 2255 | | 4270 | 510 |
| C | 75 | 1080 | | 2840 | 3795 | 510 |
| D | 75 | | 2280 | | 4175 | 490 |
| C | 90 | 1193 | | 3090 | 3880 | 490 |
| D | 90 | | 2340 | | 4050 | 470 |
| C | 105 | 1330 | | 3240 | 3980 | 485 |
| D | 105 | | 2460 | | 3890 | 450 |

It is shown from the data contained in Table IV that the reaction products of a methylol carbamide and a mercapto-thiazole such for example as a reaction product of dimethylol carbamide and mercapto-benzo-thiazole are strong accelerators when employed in tread stocks and especially strong accelerators when employed in conjunction with organic nitrogen containing accelerators as activators thereof.

As a further specific embodiment of the present invention formaldehyde was reacted with thiourea and the resulting dimethylol thiocarbamide reacted with mercapto-benzo-thiazole in a manner analogous to that hereinbefore described for the preparation of the reaction product of dimethylol carbamide and mercapto-benzo-thiazole. The product so obtained, comprising a light yellow solid melting at substantially 204° to 205° C., was incorporated in rubber stocks comprising:

|  | Stock E parts | Stock F parts |
| --- | --- | --- |
| Pale crepe rubber | 100 | 100 |
| Zinc oxide | 8 | 8 |
| Sulfur | 2.5 | 2.5 |
| Stearic acid | .5 | .5 |
| Reaction product of dimethylol thiocarbamide and mercapto-benzo-thiazole | 1.0 | .6 |
| Diphenyl guanidine phthalate |  | .05 |

The compounded rubber stock was vulcanized by heating at different times at the temperature of 30 pounds of steam pressure per square inch. The test data of the cured rubber product follow in Table V.

Table V

| Stock | Time of cure, minutes | Modulus at elasticity in lbs./in.² at elongations of— | | Tensile at break in lbs./in.² | Ultimate elongation, percent |
| --- | --- | --- | --- | --- | --- |
|  |  | 500 percent | 700 percent |  |  |
| E | 30 | 472 | 1,615 | 2625 | 785 |
| F | 30 | 533 | 1,938 | 3200 | 790 |
| E | 45 | 480 | 1,718 | 2805 | 790 |
| F | 45 | 562 | 2,055 | 2730 | 705 |
| E | 60 | 534 | 1,820 | 2660 | 770 |
| F | 60 | 607 | 2,275 | 2960 | 740 |

From the data hereinbefore set forth, it is apparent that the preferred class of materials constitute an important class of rubber vulcanization accelerators which produce a high quality rubber product when employed alone but are of particular value when employed in conjunction with a nitrogen containing accelerator as an activator thereof.

The present invention is not limited to the specific examples hereinbefore set forth wherein the preferred accelerators are employed. Other ratios of the compounding ingredients than those mentioned in the examples as well as other well known fillers, pigments and the like may be employed in the production of various types of rubber compounds, and are apparent to those skilled in the art to which this invention pertains. The present invention is limited solely by the following claims.

What is claimed is:

1. The process of vulcanizing rubber which comprises heating rubber and sulfur in the presence of a rubber vulcanization accelerator comprising a product obtainable by reacting substantially one molecular proportion of a compound having the formula

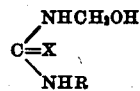

where X is a member of a group consisting in sulfur and oxygen and R is a member of a group consisting in hydrogen, an alkyl, aryl, aralkyl and CH₂OH radicals and at least one molecular proportion and not more than two molecular proportions of mercapto-aryl-thiazole of the benzene and naphthalene series.

2. The process of vulcanizing rubber which comprises heating rubber and sulfur in the presence of a rubber vulcanization accelerator comprising a product obtainable by reacting substantially one molecular proportion of dimethylol carbamide and at least one molecular proportion and not more than two molecular proportions of mercapto-aryl-thiazole of the benzene and naphthalene series.

3. The process of vulcanizing rubber which comprises heating rubber and sulfur in the presence of a rubber vulcanization accelerator comprising a product obtainable by reacting substantially one molecular proportion of dimethylol carbamide and at least one molecular proportion and not more than two molecular proportions of mercapto-benzo-thiazole.

4. The process of vulcanizing rubber which comprises heating rubber and sulfur in the presence of a rubber vulcanization accelerator comprising a product obtainable by reacting substantially one molecular proportion of dimethylol carbamide and substantially two molecular proportions of mercapto-benzo-thiazole.

5. The process of vulcanizing rubber which comprises heating rubber and sulfur in the presence of a rubber vulcanization accelerator comprising a product obtainable by reacting substantially one molecular proportion of dimethylol thiocarbamide and substantially two molecular proportions of mercapto-benzo-thiazole.

6. The process of vulcanizing rubber which comprises heating rubber and sulfur in the presence of a rubber vulcanization accelerator comprising a product obtainable by reacting substantially one molecular proportion of a compound having the formula

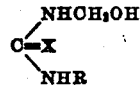

where X is a member of a group consisting in sulfur and oxygen and R is a member of a group consisting in hydrogen, an alkyl, aryl, aralkyl and CH₂OH radicals with at least one molecular proportion and not more than two molecular proportions of mercapto-aryl-thiazole of the benzene and naphthalene series, admixed with a nitrogen containing vulcanization accelerator as an activator thereof.

7. The process of vulcanizing rubber which comprises heating rubber and sulfur in the presence of a rubber vulcanization accelerator comprising a product obtainable by reacting substantially one molecular proportion of dimethylol carbamide and at least one molecular proportion and not more than two molecular proportions of mercapto-aryl-thiazole of the benzene and naphthalene series, admixed with a nitrogen containing vulcanization accelerator as an activator thereof.

8. The process of vulcanizing rubber which comprises heating rubber and sulfur in the presence of a rubber vulcanization accelerator comprising a product obtainable by reacting substantially one molecular proportion of dimethylol carbamide and substantially two molecular proportions of mercapto-benzo-thiazole, admixed with diphenyl guanidine phthalate as an activator thereof.

9. The process of vulcanizing rubber which comprises heating rubber and sulfur in the presence of a rubber vulcanization accelerator comprising a product obtainable by reacting substantially one molecular proportion of dimethylol thiocarbamide and substantially two molecular proportions of mercapto-benzo-thiazole, admixed with diphenyl guanidine phthalate.

10. The process of vulcanizing rubber which comprises heating rubber and sulfur in the presence of a rubber vulcanization accelerator comprising a product obtainable by reacting substantially one molecular proportion of dimethylol carbamide and substantially two molecular proportions of mercapto-benzo-thiazole, admixed with cyclohexylamine as an activator thereof.

11. A vulcanized rubber comprising the vulcanization product of a rubber stock containing prior to the vulcanization thereof a rubber vulcanization accelerator comprising a product obtainable by reacting substantially one molecular proportion of a compound having the formula

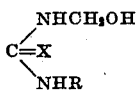

where X is a member of a group consisting in sulfur and oxygen and R is a member of a group consisting in hydrogen, an alkyl, aryl, aralkyl and CH2OH radicals and at least one molecular proportion and not more than two molecular proportions of mercapto-aryl-thiazole of the benzene and naphthalene series.

12. A vulcanized rubber comprising the vulcanization product of a rubber stock containing prior to the vulcanization thereof a rubber vulcanization accelerator comprising a product obtainable by reacting substantially one molecular proportion of dimethylol carbamide and at least one molecular proportion and not more than two molecular proportions of mercapto-aryl-thiazole of the benzene and naphthalene series.

13. A vulcanized rubber comprising the vulcanization product of a rubber stock containing prior to the vulcanization thereof a rubber vulcanization accelerator comprising a product obtainable by reacting substantially one molecular proportion of dimethylol carbamide and at least one molecular proportion and not more than two molecular proportions of mercapto-benzo-thiazole.

14. A vulcanized rubber comprising the vulcanization product of a rubber stock containing prior to the vulcanization thereof a rubber vulcanization accelerator comprising a product obtainable by reacting substantially one molecular proportion of dimethylol carbamide and substantially two molecular proportions of mercapto-benzo-thiazole.

15. A vulcanized rubber comprising the vulcanization product of a rubber stock containing prior to the vulcanization thereof a rubber vulcanization accelerator comprising a product obtainable by reacting substantially one molecular proportion of dimethylol thiocarbamide and substantially two molecular proportions of mercapto-benzo-thiazole.

16. A vulcanized rubber comprising the vulcanization product of a rubber stock containing prior to the vulcanization thereof a rubber vulcanization accelerator comprising a product obtainable by reacting substantially one molecular proportion of a compound having the formula

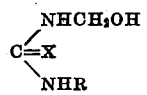

where X is a member of a group consisting in sulfur and oxygen and R is a member of a group consisting in hydrogen, an alkyl, aryl, aralkyl and CH2OH radicals with at least one molecular proportion and not more than two molecular proportions of mercapto-aryl-thiazole of the benzene and naphthalene series, admixed with a nitrogen containing vulcanization accelerator as an activator thereof.

17. A vulcanized rubber comprising the vulcanization product of a rubber stock containing prior to the vulcanization thereof a rubber vulcanization accelerator comprising a product obtainable by reacting substantially one molecular proportion of dimethylol carbamide and at least one molecular proportion and not more than two molecular proportions of mercapto-aryl-thiazole of the benzene and naphthalene series, admixed with a nitrogen containing vulcanization accelerator as an activator thereof.

18. A vulcanized rubber comprising the vulcanization product of a rubber stock containing prior to the vulcanization thereof a rubber vulcanization accelerator comprising a product obtainable by reacting substantially one molecular proportion of dimethylol carbamide and substantially two molecular proportions of mercapto-benzo-thiazole, admixed with diphenyl guanidine phthalate as an activator thereof.

19. A vulcanized rubber comprising the vulcanization product of a rubber stock containing prior to the vulcanization thereof a rubber vulcanization accelerator comprising a product obtainable by reacting substantially one molecular proportion of dimethylol thiocarbamide and substantially two molecular proportions of mercapto-benzo-thiazole, admixed with diphenyl guanidine phthalate.

20. A vulcanized rubber comprising the vulcanization product of a rubber stock containing prior to the vulcanization thereof a rubber vulcanization accelerator comprising a product obtainable by reacting substantially one molecular proportion of dimethylol carbamide and substantially two molecular proportions of mercapto-benzo-thiazole, admixed with cyclohexylamine as an activator thereof.

21. A vulcanization accelerator possessing the structural formula

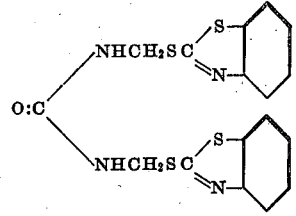

22. A vulcanization accelerator possessing the structural formula

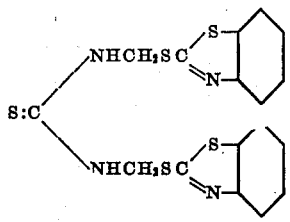

23. The process of vulcanizing rubber which comprises heating rubber and sulfur in the presence of a rubber vulcanization accelerator comprising a product obtainable by reacting substantially one molecular proportion of a methylol carbamide, the carbonyl carbon atom of which is directly attached to a sulfur or oxygen atom, and at least one molecular proportion and not more than two molecular proportions of a mercapto-aryl-thiazole of the benzene and naphthalene series.

24. A vulcanized rubber product comprising the vulcanization product of a rubber stock containing prior to the vulcanization thereof a rubber vulcanization accelerator comprising a product obtainable by reacting substantially one molecular proportion of a methylol carbamide, the carbonyl carbon atom of which is directly attached to a sulfur or oxygen atom, and at least one molecular proportion and not more than two molecular proportions of a mercapto-aryl-thiazole of the benzene and naphthalene series.

25. A vulcanization accelerator possessing the structural formula

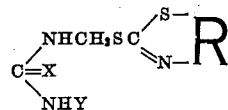

where X is a member of a group consisting in sulfur and oxygen, Y is one of a group consisting in hydrogen, an alkyl, aryl, aralkyl, CH₂OH radicals and the grouping

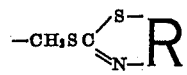

and R is an arylene radical of the benzene and naphthalene series.

ROBERT L. SIBLEY.